US012152862B2

(12) United States Patent
Samborski et al.

(10) Patent No.: US 12,152,862 B2
(45) Date of Patent: Nov. 26, 2024

(54) TIGHTLY COUPLED TRAJECTORY PREDICTOR WITH CONSTANT UP-FINDING

(71) Applicant: Honeywell International Inc., Charlotte, NC (US)

(72) Inventors: Calvin Samborski, Saint Louis Park, MN (US); Scott Snyder, Mahtomedi, MN (US)

(73) Assignee: Honeywell International Inc., Charlotte, NC (US)

( * ) Notice: Subject to any disclaimer, the term of this patent is extended or adjusted under 35 U.S.C. 154(b) by 863 days.

(21) Appl. No.: 17/179,039

(22) Filed: Feb. 18, 2021

(65) Prior Publication Data

US 2022/0260341 A1    Aug. 18, 2022

(51) Int. Cl.
| | |
|---|---|
| *F41G 7/36* | (2006.01) |
| *F41G 7/22* | (2006.01) |
| *G05D 1/00* | (2024.01) |
| *G06F 17/10* | (2006.01) |

(52) U.S. Cl.
CPC ............. *F41G 7/36* (2013.01); *F41G 7/2213* (2013.01); *F41G 7/222* (2013.01); *G05D 1/0088* (2013.01); *G06F 17/10* (2013.01)

(58) Field of Classification Search
CPC .......... F41G 7/36; F41G 7/2213; F41G 7/222; F41G 7/346; G05D 1/0088; G05D 1/0808; G06F 17/10; G01C 21/165
USPC ..... 701/116; 73/660, 861.75, 1.78; 102/501; 244/3.1, 3.16, 3.17; 356/3.02, 3.09; 382/103
See application file for complete search history.

(56) References Cited

U.S. PATENT DOCUMENTS

| | | | |
|---|---|---|---|
| 7,249,730 B1* | 7/2007 | Flippen, Jr. | ............. F41G 7/346 |
| 7,395,987 B2 | 7/2008 | Lindquist et al. | |
| 8,513,580 B1* | 8/2013 | Phillips | .................. F42B 10/62 |
| 10,571,271 B2 | 2/2020 | Faulkner et al. | |

(Continued)

FOREIGN PATENT DOCUMENTS

| | | |
|---|---|---|
| CN | 104165640 A | 11/2014 |
| CN | 105115508 A | 12/2015 |

(Continued)

OTHER PUBLICATIONS

Rogers et al., "A Low-Cost Orientation Estimator for Smart Projectiles Using Magnetometers and Thermopiles", Navigation: Journal of The Institute of Navigation, Spring 2012, pp. 9 through 24, vol. 59, No. 1, Navigation.

(Continued)

*Primary Examiner* — Russell Frejd
*Assistant Examiner* — Ellis B. Ramirez
(74) *Attorney, Agent, or Firm* — Fogg & Powers LLC (57) ABSTRACT

Systems and methods for a tightly coupled trajectory predictor with constant up-finding are provided. In certain embodiments, a system includes an inertial measurement unit that provides inertial measurements of a vehicle. The system also includes an up-finding sensor that provides up-finding measurements based on when a portion of the vehicle is pointing up. Further, the system includes one or more processors that bound errors from the inertial measurements in a navigation solution during navigation of the vehicle using the up-finding measurements.

15 Claims, 4 Drawing Sheets

(56) References Cited

U.S. PATENT DOCUMENTS

| | | | |
|---|---|---|---|
| 2007/0023567 A1* | 2/2007 | Lindquist | F41G 7/222 |
| 2009/0039197 A1* | 2/2009 | Maynard | F42B 15/01 |
| 2010/0133374 A1* | 6/2010 | Geswender | F42B 15/01 |
| 2016/0282123 A1* | 9/2016 | McCroskey | G01C 21/025 |
| 2018/0340779 A1* | 11/2018 | Faulkner | G01C 21/188 |
| 2020/0318967 A1* | 10/2020 | Choiniere | G01S 1/08 |
| 2021/0041897 A1* | 2/2021 | Choiniere | G01S 1/7038 |

FOREIGN PATENT DOCUMENTS

| | | |
|---|---|---|
| CN | 105180728 A | 12/2015 |
| CN | 111381217 A | 7/2020 |
| EP | 3073223 A1 | 9/2016 |

OTHER PUBLICATIONS

Zhang et al., "In-Flight Self-Alignment Method Aided by Geomagnetism for Moving Basement of Guided Munitions", Journal of Control Science and Engineering, vol. 2015, pp. 1 through 8, Hindawi Publishing Corporation, http://dx.doi.org/10.1155/2015/425698.

European Patent Office, "Extended European Search Report from EP Application No. 22154370.5", from Foreign Counterpart to U.S. Appl. No. 17/179,039, filed Jul. 22, 2022, pp. 1 through 9, Published: EP.

Israel Patent Office, "Notice of Deficiencies for Patent Application 290053" from IL Application No. 290053, Feb. 6, 2024, from Foreign Counterpart to U.S. Appl. No. 17/179,039, pp. 1 through 4, Published: IL.

\* cited by examiner

TIGHTLY COUPLED TRAJECTORY PREDICTOR WITH CONSTANT UP-FINDING

BACKGROUND

Many systems use inertial navigation systems to increase the accuracy, efficiency, safety, and other operational characteristics of the systems. These inertial navigation systems require initialization and provide a basis for an integrated navigation solution, where the integrated navigation solution describes an optimized navigational state of the systems. Some systems may also include a trajectory predictor that uses input initial conditions, together with vehicle model parameters and time, to calculate a predicted trajectory. The system may use the predicted trajectory solution to provide initial conditions to an inertial navigation solution. The system can improve the accuracy of the integrated navigation solution by comparing the predicted trajectory against the integrated navigation solution to improve the accuracy of the integrated navigation solution. Integrated navigation systems typically receive external aiding measurements at specific windows during operation. For example, the external aiding may include up-finding measurements at the beginning of operation and a range-to-target.

The trajectory predictors use vehicle initial conditions, model parameters and time to predict vehicle location. Inertial navigation solutions use initial navigation position, initial navigation velocity, initial navigation attitude, and the continuous inertial measurement outputs to compute continuous navigation position, velocity and attitude. Trajectory predictor errors arise from errors in initial conditions, model parameter errors, and unmodeled vehicle dynamics while inertial navigation errors depend on navigation initial conditions and inertial measurement unit errors.

SUMMARY

Systems and methods for a tightly coupled trajectory predictor with constant up-finding are provided. In certain embodiments, a system includes an inertial measurement unit that provides inertial measurements of a vehicle. The system also includes an up-finding sensor that provides up-finding measurements based on when a portion of the vehicle is pointing up. Further, the system includes one or more processors that bound errors from the inertial measurements in a navigation solution during navigation of the vehicle using the up-finding measurements.

DRAWINGS

Drawings accompany this description and depict only some embodiments associated with the appended claims. Thus, the described and depicted embodiments should not be considered limiting in scope. The accompanying drawings and specification describe the exemplary embodiments, and features thereof, with additional specificity and detail, in which:

Under common practice, the various described features are not drawn to scale but are drawn to emphasize specific features relevant to the example embodiments.

DETAILED DESCRIPTION

In the following detailed description, reference is made to the accompanying drawings that form a part of the present description, and in which is shown, through illustration, specific illustrative embodiments. However, it is to be understood that other embodiments may be used and that logical, mechanical, and electrical changes may be made.

The present disclosure describes systems and methods for a tightly coupled trajectory predictor with constant up-finding and inertial navigation. For example, the trajectory predictor provides position, velocity, and attitude updates based on constant up-finding. As used herein, constant up-finding may refer to the use of up-finding measurements as they become available. The integrated system tightly couples the trajectory predictions to the navigation solution by calculating position, velocity, and attitude updates based on a comparison of the trajectory prediction solution to the inertial navigation solution to reduce the amount of integrated error in the integrated navigation solution.

Constant up-finding provides an advantage for trajectory predictors. For a typical trajectory predictor, external aiding measurements are sporadically available. For example, typical trajectory predictors receive an up-finding measurement at the beginning of operation, a range to target at the mid-point of operation, and potential position updates during operation. When systems lack constant external aiding measurements, movement of the system can lead to inertial error drift that can corrupt the navigation solution. Constant-up-finding may aid in the bounding of inertial drift errors in the navigation solution.

Figure 1:
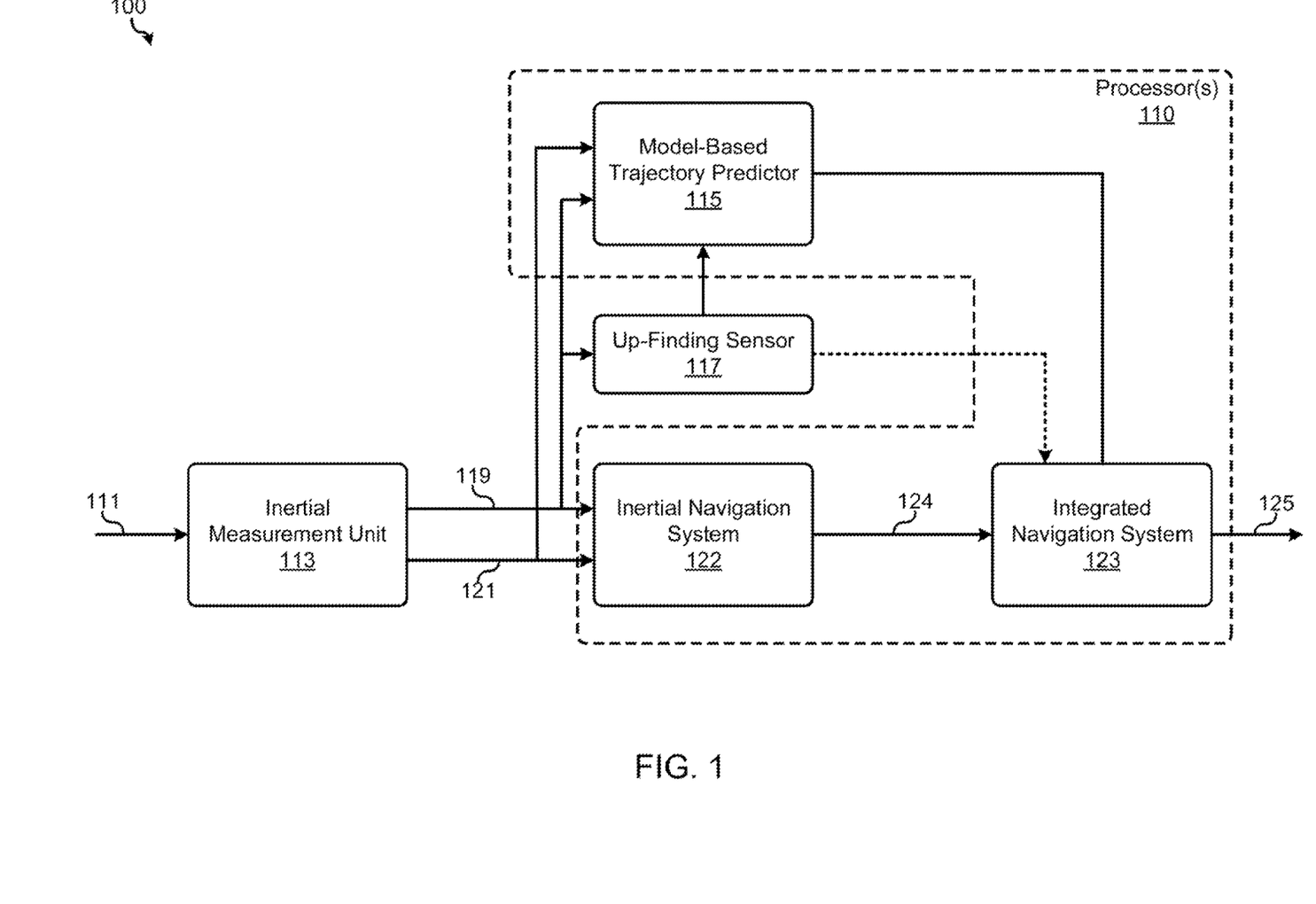
FIG. 1 is a block diagram illustrating a system with a tightly coupled trajectory predictor with constant up-finding and an inertial navigation solution according to an aspect of the present disclosure.

FIG. 1 is a block diagram of a system 100 for using constant up-finding in a vehicle to provide an integrated navigation solution 125. The system 100 may monitor the movement of a vehicle or object. For example, the vehicle may be a car, an aircraft, a spacecraft, a personal navigation device, or other type of device. In some embodiments, the system 100 is a spinning projectile, like a ballistic missile. To calculate the integrated navigation solution 125, the system 100 may monitor object dynamics 111, where the object dynamics 111 include measurable, dynamic movements of the object.

In certain embodiments, the system 100 may include an inertial measurement unit 113. The inertial measurement unit 113 may include instruments and sensors to measure the object dynamics 111. The inertial measurement unit 113 may include gyroscopes to measure rotation and accelerometers to measure acceleration. Accordingly, the inertial measurement unit 113 may provide angular rate measurements 119 and specific force measurements 121 as outputs. In addition to the inertial measurement unit 113, the system 100 may include additional sensors to measure the object dynamics 111. The additional sensors may include magnetometers, barometers, velocimeters, global navigation satellite system receivers, and other devices.

In some embodiments, the inertial measurement unit 113 may provide the angular rate measurements 119 and the specific force measurements 121 to an inertial navigation system 122. The inertial navigation system 122 may calculate an inertial navigation solution 124 based on the received angular rate measurements 119 and specific force measurements 121. As the inertial navigation system 122 uses dead reckoning to calculate the inertial navigation solution 124 from incremental acceleration and rotation measurements, the calculated inertial navigation solution 124 may drift because of the accumulation of measurement errors in the acceleration and rotation measurements. In some embodiments, the inertial navigation system 122 may use information from one or more aiding sources to act as a bound for the drift in the inertial navigation solution 124. For example, the inertial navigation system 122 may receive aiding GNSS measurements from a GNSS receiver and other sensors. However, in some operational environments, the aiding sources may become unavailable. For example, the object may operate within a GNSS-denied environment, receive spoofing or jamming GNSS signals, and the like.

In certain embodiments, the inertial navigation system 122 provides the inertial navigation solution 124 to an integrated navigation system 123. The integrated navigation system 123 receives aiding information regarding trajectory prediction for an object from a model-based trajectory predictor 115. The model-based trajectory predictor 115 may be implemented within a computing device, such as a processor(s) 110, where the model-based trajectory predictor 115 provides trajectory information for an object traveling along a trajectory based on simulated model information. The trajectory information may include estimates of position, velocity, and attitude. The model information may include information used by the model-based trajectory predictor 115 when providing the trajectory information. Typically, the model information may include the initial state of the object. For example, when the object is a ballistic missile, the initial state may include information regarding the initial velocity, initial direction, atmospheric conditions, and flight path, among other factors that potentially affect the predicted trajectory.

In certain embodiments, the model-based trajectory predictor 115 may receive measurements from other sensors during flight. The model-based trajectory predictor 115 may use the received measurements to increase the accuracy of the calculated trajectory information. For example, the model-based trajectory predictor 115 may receive the angular rate measurements 119 and specific force measurements 121 from the inertial measurement unit 113. The model-based trajectory predictor 115 may update the trajectory predictions based on the received angular rate measurements 119 and specific force measurements 121 during the flight of the object.

In exemplary embodiments, the system 100 may also include an up-finding sensor 117. The up-finding sensor 117 is a device that determines when a portion of an object is facing up, down, or another direction. As used herein, the term "up" may refer to when an object, or face thereon, is facing a direction away from the ground. While the sensor 117 is referred to as an up-finding sensor, the up-finding sensor 117 may determine when the object is facing a different direction, i.e. down. For example, the up-finding sensor 117 may determine when a portion or monitored location on the object is facing away from the ground or up. Alternatively, the up-finding sensor 117 may determine when the monitored location is facing a particular monitoring station. The up-finding sensor 117 may be a device that emits light or a signal for reflection off a surface. When the up-finding sensor 117 does not receive a reflected light or signal, the up-finding sensor 117 determines that the monitored location is facing up. In some embodiments, the up-finding sensor 117 may receive a signal from a ground station. When the up-finding sensor 117 receives the signal, the up-finding sensor 117 determines that the monitored location is facing the ground station. When the up-finding sensor 117 does not receive the signal, the up-finding sensor 117 determines that the monitored location is facing up or not facing the ground station.

In some embodiments, the up-finding sensor 117 may determine the up direction using quantized measurements. For example, when the object is spinning, the up-finding sensor 117 may emit laser light. When the up-finding sensor 117 detects reflections of the emitted laser light, the up-finding sensor 117 may indicate the reception of reflected laser light with a "0" or other similarly indicative symbols. When the up-finding sensor 117 fails to detect reflections of the emitted laser light, the up-finding sensor 117 may indicate that reflections are not being received with a "1". The up-finding sensor 117 in communication with the up-finding sensor 117 may determine that an object has spun 360° when the up-finding sensor 117 provides sequences of "1-0-1" or "0-1-0." The up-finding sensor 117 may then communicate that the object has spun 360° to the model-based trajectory predictor 115. Alternatively, the up-finding sensor 117 may increment a spin counter, where the spin counter counts how many revolutions the object has experienced as determined by the up-finding sensor 117. The up-finding sensor 117 then provides the count from the spin counter to the model-based trajectory predictor 115. While a "0" is used for the reception of light and a "1" is used for the lack of light, the "1" can indicate the reception of light and the "0" the lack of light. The up-finding sensor 117 may also determine that no light is received when the received light is below a no-light threshold value and that light is being received when the received light is above a received light threshold value. The no-light threshold value and the received light threshold value may or may not be equal.

In another embodiment, the up-finding sensor 117 may find up by monitoring the periodicity of the measured intensity of the received reflected light. For example, the up-finding sensor 117 may receive light intensity measurements and track the change in light intensity. When the sign of the change in light intensity changes from positive to negative or from negative to positive, the up-finding sensor 117 may determine that the up-finding sensor 117 has measured a maximum or a minimum light intensity. The up-finding sensor 117 may determine that the object has spun 360° on every other sign change.

In certain embodiments, the up-finding sensor 117 provides up-finding information to the model-based trajectory predictor 115. The up-finding information may include a notification to the model-based trajectory predictor 115 that the up-finding sensor 117 has detected a complete rotation of the object or the up-finding sensor 117 is currently detecting the up direction. For example, the up-finding sensor 117 may transmit either a "1" or "0" to the model-based trajectory predictor 115 to indicate whether the up-finding sensor 117 is currently detecting the up direction. Alternatively, the up-finding information may include a count of how often the up-finding sensor 117 has determined that the monitored location has faced a particular direction.

In additional embodiments, the up-finding sensor 117 provides up-finding measurements continuously. For example, while the vehicle is in motion, the up-finding sensor 117 attempts to find up or other particular direction. Alternatively, the up-finding sensor 117 provides up-finding measurements over non-contiguous time periods. For example, the up-finding sensor 117 provides up-finding measurements over a first time period and then may stop providing measurements for a time, before providing additional measurements for a second time period. Also, the up-finding sensor 117 may provide measurements every tenth time (or other number of detections) up is detected.

In some embodiments, the object may spin at a particular rate. The model-based trajectory predictor 115 may use the information about how often the up-finding sensor 117 determines that an object is facing up along with the spin rate as an additional source of information. Additionally, the model-based trajectory predictor 115 may predict the number of rotations experienced by the object. The model-based trajectory predictor 115 may use the detected number of rotations from the up-finding sensor 117 to act as a bound for errors in the predicted number of rotations. Additionally, the model-based trajectory predictor 115 may calculate the number of rotations based on the received angular rate measurements 119 from the inertial measurement unit 113. The model-based trajectory predictor 115 may use information as predicted by the model-based trajectory predictor 115, the angular rate measurements 119, and the up-finding information from the up-finding sensor 117 to provide a measurement for the number of rotations experienced by the object.

In certain embodiments, the model-based trajectory predictor 115 provides trajectory information to an integrated navigation system 123. The integrated navigation system 123 uses measurements from multiple sources in the system 100 as inputs for a filter, such as a Kalman filter or other filter. For example, the integrated navigation system 123 calculates a predicted navigation state. The predicted navigation state includes the position, velocity, and attitude of a moving object associated with the integrated navigation system 123. The integrated navigation system 123 then uses inertial navigation solution 124 and the prediction from the model-based trajectory predictor 115 as measurement inputs for the Kalman filter. The integrated navigation system 123 uses the measurements to update the predicted navigation state. As the prediction from the model-based trajectory predictor 115 is based on the information from the up-finding sensor 117, the prediction is not subject to the same errors that affect the inertial navigation solution 124 from the inertial navigation system 122. Thus, the measurements from the up-finding sensor 117 can limit the drift errors that occur in the inertial navigation solution 124.

In alternative embodiments, the up-finding sensor 117 provides the up-finding information directly to the integrated navigation system 123. When the integrated navigation system 123 receives the up-finding information from the up-finding sensor 117, the integrated navigation system 123 may use the up-finding information in much the same way the integrated navigation system 123 used the prediction from the model-based trajectory predictor 115 to bound errors in the inertial navigation solution 124 provided by the inertial navigation system 122.

In some embodiments, the model-based trajectory predictor 115, the inertial navigation system 122, and the integrated navigation system 123 may be implemented using one or more processors 110 and memory storage devices. The one or more processors 110 may be implemented using software, firmware, hardware, or other appropriate combinations thereof. The processor and/or other computational devices may be supplemented by, or incorporated in, specially designed application-specific integrated circuits (ASICs) or field programmable gate arrays (FPGAs). The processor may be a general or special purpose computer or processor, or other programmable logic devices. The processor and other computing devices may also include or function with software programs, firmware, or other computer-readable instructions for carrying out various process tasks, calculations, and control functions used in the present methods and systems.

Further, computer-executable instructions (such as program modules or components) may implement the methods described in this description. At least one processor may execute the computer-executable instructions. Software, firmware, or other execution-capable devices may execute the computer-readable instructions for carrying out various process tasks, calculations, and generation of data used in the operations of the described methods. The computer-readable instructions may be stored as part of one or more appropriate computer-program products, where a computer-program product may be a set of computer-readable instructions or data structures stored on a computer-readable medium. The computer-readable medium may be a media that stores data that can be accessed by the processor or other computing device. In certain implementations, the computer-readable medium may form a part of the memory storage devices used to implement the model-based trajectory predictor 115, the inertial navigation system 122, and the integrated navigation system 123.

Computer-readable mediums may include non-volatile memory devices. Non-volatile memory devices may include semiconductor memory devices such as random access memory (RAM), read-only memory (ROM), electrically erasable programmable ROM (EEPROM), or flash memory devices. The non-volatile memory devices may also include magnetic disks (such as internal hard disks or removable disks), optical storage devices (such as compact discs (CDs), digital versatile discs (DVDs), Blu-ray discs), or other media that can store computer-executable instructions or data structures.

Figure 2:
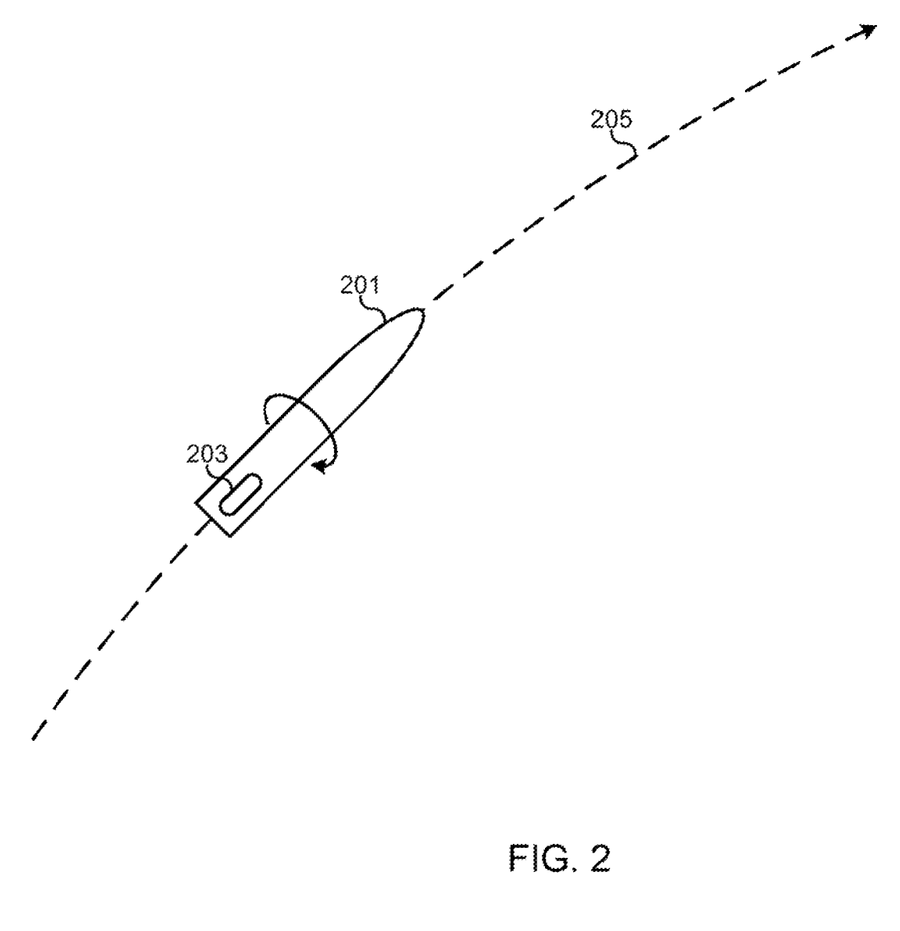
FIG. 2 is a diagram illustrating the use of an up-finder mounted to a spinning ballistic according to an aspect of the present disclosure.

FIG. 2 is a diagram illustrating the path 205 of a spinning projectile 201 having an up-finding sensor 203 mounted on the spinning projectile 201. As discussed above, the up-finding sensor 203 may detect how many times the spinning projectile 201 spins around. The up-finding sensor 203 may provide cumulative measurements of how often the up direction is detected along the path 205, or the up-finding sensor 203 may provide individual measurements that the up-finding sensor 203 is detecting the up direction. The up-finding sensor 203 may provide the measurements to either a trajectory predictor, such as the model-based trajectory predictor 115 in FIG. 1, or an integrated navigation system such as the integrated navigation system 123 in FIG. 1. The integrated navigation system may use the measurements from the up-finding sensor 203 to act as a bound for potential errors that develop from inertial measurements, such as the drift errors that develop in the inertial navigation solution 124.

In some embodiments, the up-finding sensor 203 may produce up-finding measurements independently of systems or devices not located on the spinning projectile 201. Thus, unlike some measurement sources that communicate with systems and devices that are not on the spinning projectile 201, like GNSS measurements, the up-finding sensor 203 may provide up-finding measurements without being affected by environmental effects and interfering sources (like interference and spoofing signals). Accordingly, the up-finding sensor 203 may provide measurements while the spinning projectile 201 travels along the path 205 independent of other devices.

Figure 3:
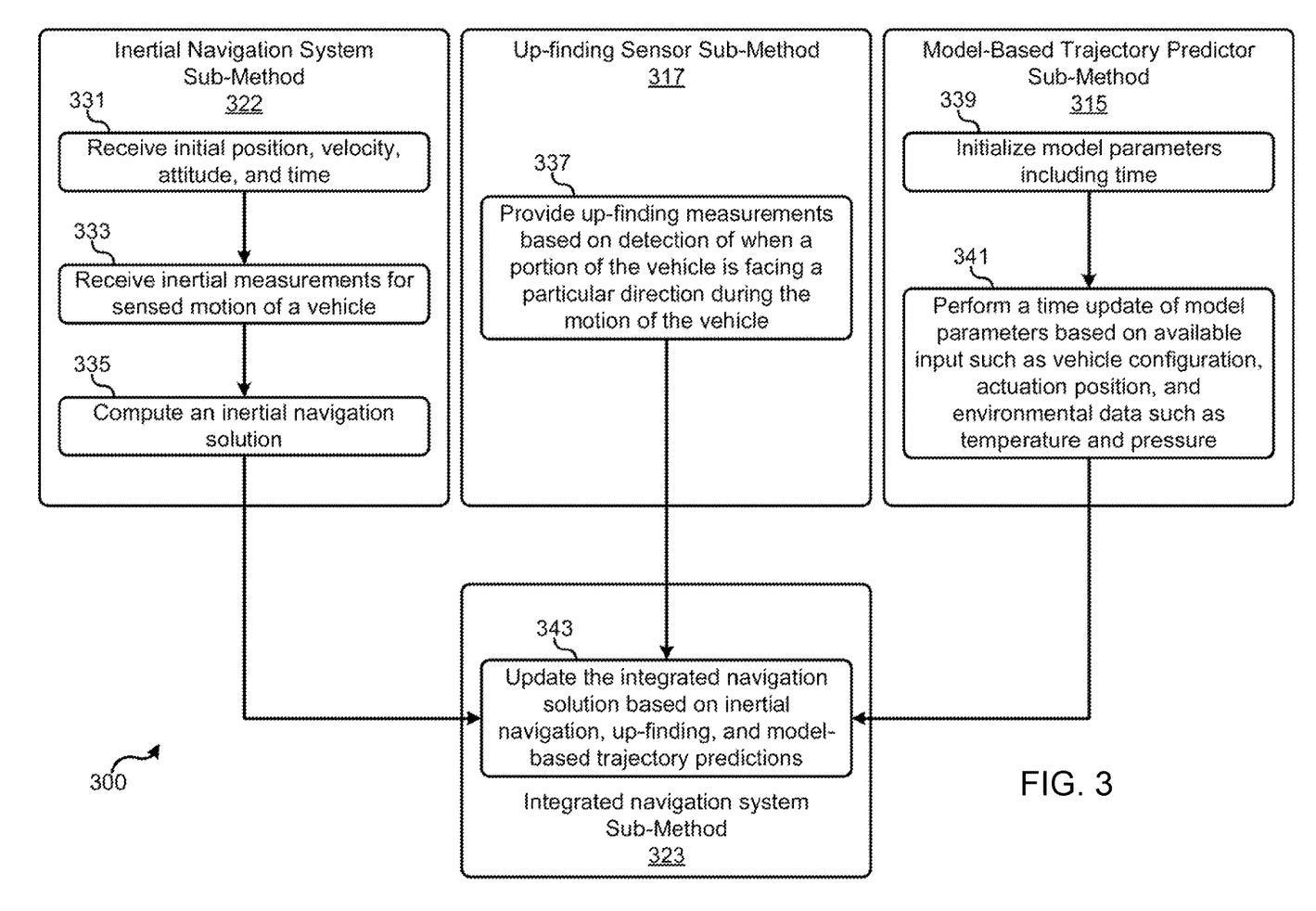
FIG. 3 is a flowchart diagram of a method for using a tightly coupled trajectory predictor with constant up-finding and inertial navigation according to an aspect of the present disclosure.

FIG. 3 is a flowchart diagram of a method 300 for using a tightly coupled trajectory predictor with constant up-finding and inertial navigation. As illustrated, the method 300 displays separate sub-methods performed by different components of the system 100 in FIG. 1. For example, the method 300 illustrates an inertial navigation system sub-method 322 performed by the inertial navigation system 122, an up-finding sensor sub-method 317 performed by the up-finding sensor 117, a model-based trajectory predictor sub-method 315 performed by the model-based trajectory predictor 115, and an integrated navigation system sub-method 323 performed by the integrated navigation system 123.

In certain embodiments, the inertial navigation system sub-method 322 proceeds at 331, where an initial position, velocity, attitude, and time is received. For example, the inertial navigation system 122 may receive initial navigation data from an external source, such as a GNSS satellite, another sensor, or through manual entry by a pilot, user, or other individual. The inertial navigation system sub-method 322 proceeds at 333, where inertial measurements for sensed motion of a vehicle are received. For example, during motion, a vehicle may receive inertial measurements from inertial sensors coupled to the inertial navigation system 122. Further, the inertial navigation system sub-method 322 proceeds at 335, where an inertial navigation solution is computed. For example, the inertial navigation system 122 may use the received inertial measurements and the received initial position, velocity, attitude, and time measurements to calculate an inertial navigation solution.

In additional embodiments, the up-finding sensor sub-method 317 proceeds at 337, where up-finding measurements are provided based on detection of when a portion of the vehicle is facing a particular direction during the motion of the vehicle. For example, the up-finding sensor 117 may detect when a particular location on a vehicle is facing up or some other particular direction. The up-finding sensor may provide indications that the particular location is facing a particular direction or provide a count of the separate times that the up-finding sensor has detected that the particular location faced the particular direction.

In further embodiments, the model-based trajectory predictor sub-method 315 may proceed at 339, where model parameters, including time, are initialized. Additionally, the model-based trajectory predictor sub-method 315 may proceed at 341, where a time update of model parameters is performed based on available input such as vehicle configuration, actuation position, and environmental data such as temperature and pressure. In some implementations, the inputs may include information from the up-finding sensor.

Figure 4:
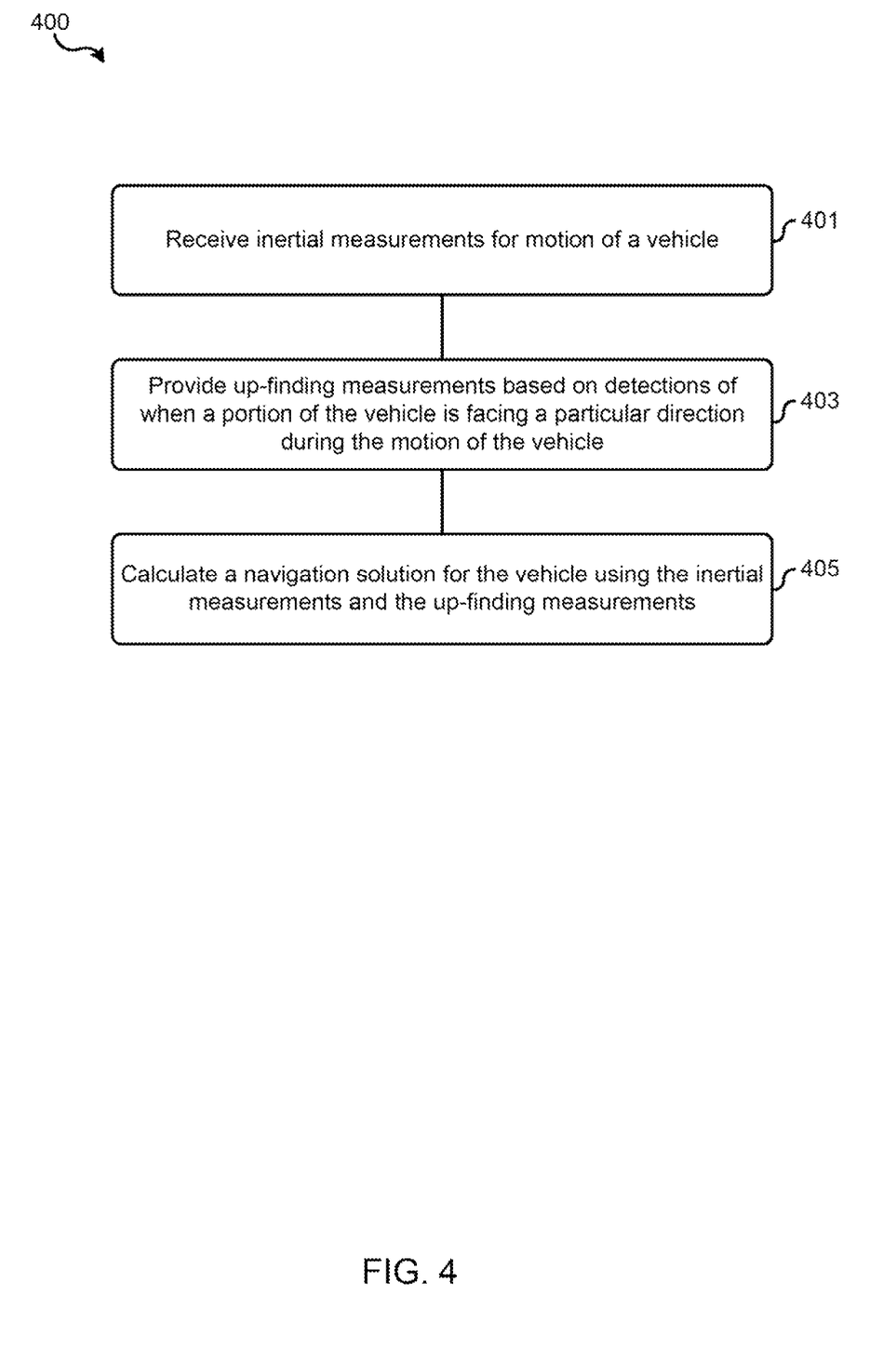
FIG. 4 is a flowchart diagram of a method for using tightly coupled trajectory predictor with constant up-finding and inertial navigation according to an aspect of the present disclosure.

In additional embodiments, the integrated navigation system sub-method 323 may proceed at 343, where the integrated navigation solution is updated based on inertial navigation, up-finding, and model-based trajectory predictions. For example, the integrated navigation system 123 may receive the products of the inertial navigation system sub-method 322, the up-finding sensor sub-method 317, and the model-based trajectory predictor sub-method 315. Using the information from the different sub-methods, the integrated navigation system 123 may calculate an integrated navigation solution. Sure FIG. 4 is a flowchart diagram of a method 400 for using a tightly coupled trajectory predictor with constant up-finding and inertial navigation. The method 400 proceeds at 401, where inertial measurements are received for motion of a vehicle. Also, the method 400 proceeds at 403, where up-finding measurements are provided based on detections of when a portion of the vehicle is facing a particular direction during the motion of the vehicle. Further, the method 400 proceeds at 405, where a navigation solution is calculated for the vehicle using the inertial measurements and the up-finding measurements. For example, an up-finding sensor may provide up-finding measurements to a model-based trajectory predictor that uses the up-finding measurements to provide trajectory predictions for the vehicle to an inertial navigation system. The inertial navigation system may use the trajectory predictions as a bound for error drift from the inertial measurements.

EXAMPLE EMBODIMENTS

Example 1 includes a system comprising: an inertial measurement unit that provides inertial measurements of a vehicle; an up-finding sensor that provides up-finding measurements based on when a portion of the vehicle is pointing up; and one or more processors that bound errors from the inertial measurements in a navigation solution during navigation of the vehicle using the up-finding measurements.

Example 2 includes the system of Example 1, wherein the vehicle is a spinning projectile.

Example 3 includes the system of any of Examples 1-2, wherein the up-finding measurements comprise a number of non-contiguous time periods when the vehicle is pointing up.

Example 4 includes the system of any of Examples 1-3, wherein the one or more processors implement a model-based trajectory predictor, wherein the model-based trajectory predictor calculates trajectory predictions based on the up-finding measurements.

Example 5 includes the system of Example 4, wherein the one or more processors use the trajectory predictions to bound the errors in the inertial measurements.

Example 6 includes the system of any of Examples 1-5, wherein the up-finding sensor acquires the up-finding measurements without communicating with devices not located on the vehicle.

Example 7 includes the system of any of Examples 1-6, wherein the up-finding measurements are acquired through detecting reflections of an emitted laser and determining at least one of: whether the reflections are being received; and periodicity of intensity of the detected reflections.

Example 8 includes the system of any of Examples 1-7, wherein the one or more processors bound the errors in the inertial measurements by comparing a number of detected spins from the up-finding measurements against a number of estimated spins based on the inertial measurements.

Example 9 includes the system of any of Examples 1-8, wherein the up-finding measurements comprise at least one of: an indication that the up-finding sensor has pointed towards a particular direction; and a count of a number of times the up-finding sensor has pointed toward the particular direction.

Example 10 includes a method comprising: receiving inertial measurements for motion of a vehicle; providing up-finding measurements based on detections of when a portion of the vehicle is facing a particular direction during the motion of the vehicle; and calculating an integrated navigation solution for the vehicle using the inertial measurements and the up-finding measurements, wherein the up-finding measurements provide a bound for errors in the inertial measurements.

Example 11 includes the method of Example 10, wherein the vehicle is a spinning projectile.

Example 12 includes the method of any of Examples 10-11, wherein the up-finding measurements comprise a number of non-contiguous time periods when the vehicle is pointing up.

Example 13 includes the method of any of Examples 10-12, wherein providing the up-finding measurements comprises providing the up-finding measurements to a model-based trajectory predictor, wherein the model-based trajectory predictor calculates trajectory predictions based on the up-finding measurements.

Example 14 includes the method of Example 13, wherein calculating the integrated navigation solution comprises calculating the integrated navigation solution based on the trajectory predictions and the inertial measurements.

Example 15 includes the method of any of Examples 10-14, wherein the up-finding measurements are acquired by an up-finding sensor that acquires the up-finding measurements without communicating with devices not located on the vehicle.

Example 16 includes the method of any of Examples 10-15, wherein the up-finding measurements are acquired through detecting reflections of an emitted laser and determining at least one of: whether the reflections are being received; and periodicity of intensity of the detected reflections. Example 17 includes the method of any of Examples 10-16, wherein the up-finding measurements provide the bound for the errors in the inertial measurements by comparing a number of detected spins from the up-finding measurements against a number of estimated spins based on the inertial measurements.

Example 18 includes the method of any of Examples 10-17, wherein the up-finding measurements comprise at least one of: an indication that an up-finding sensor making the up-finding measurements has pointed towards the particular direction; and a count of a number of times the up-finding sensor has pointed toward the particular direction.

Example 19 includes a system comprising: an inertial measurement unit that provides inertial measurements of a vehicle; an up-finding sensor that provides up-finding measurements based on when a portion of the vehicle is pointing up; and one or more processors configured to: implement a model-based trajectory predictor, wherein the model-based trajectory predictor calculates trajectory predictions based on the up-finding measurements; and bound errors in the inertial measurements during navigation of the vehicle using the trajectory predictions.

Example 20 includes the system of Example 19, wherein the up-finding sensor acquires the up-finding measurements without communicating with devices not located on the vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   an inertial measurement unit that provides inertial measurements of a vehicle;
   an up-finding sensor that provides up-finding measurements based on when a portion of the vehicle is pointing up, wherein the up-finding sensor uses light to detect when the portion of the vehicle is facing a particular direction; and
   one or more processors configured to implement a model-based trajectory predictor, wherein the model-based trajectory predictor calculates trajectory predictions using at least one of the up-finding measurements and the inertial measurements as inputs;
   wherein the one or more processors are configured to implement an integrated navigation system that uses a count of a number of revolutions for the vehicle based on the detections of when the portion of the vehicle is pointing up from the up-finding sensor and the trajectory predictions from the model-based trajectory predictor to bound errors from the inertial measurements in an inertial navigation solution during navigation of the vehicle by comparing the count of the number revolutions against a number of estimated spins based on the inertial measurements.

2. The system of claim 1, wherein the vehicle is a spinning projectile.

3. The system of claim 1, wherein the up-finding measurements comprise a number of non-contiguous time periods when the vehicle is pointing up.

4. The system of claim 1, wherein the up-finding sensor acquires the up-finding measurements without communicating with devices not located on the vehicle.

5. The system of claim 1, wherein the up-finding measurements are acquired through detecting reflections of an emitted laser and determining at least one of:
   whether the reflections are being received; and
   periodicity of intensity of the detected reflections.

6. The system of claim 1, wherein the up-finding measurements comprise at least one of:
   an indication that the up-finding sensor has pointed towards the particular direction; and
   a count of a number of times the up-finding sensor has pointed toward the particular direction.

7. A method comprising:
   receiving inertial measurements for motion of a vehicle;
   providing up-finding measurements based on detections of when a portion of the vehicle is facing a particular direction during the motion of the vehicle to a model-based trajectory predictor executed by a processor, wherein the model-based trajectory predictor calculates trajectory predictions using at least one of the up-finding measurements and the inertial measurements;
   calculating an integrated navigation solution for the vehicle using the inertial measurements, the trajectory predictions, and the up-finding measurements, wherein the up-finding measurements and the trajectory predictions provide a bound for errors in the inertial measurements; and
   using the navigation solution during navigation of the vehicle.

8. The method of claim 7, wherein the vehicle is a spinning projectile.

9. The method of claim 7, wherein the up-finding measurements comprise a number of non-contiguous time periods when the vehicle is pointing up.

10. The method of claim 7, wherein the up-finding measurements are acquired by an up-finding sensor that acquires the up-finding measurements without communicating with devices not located on the vehicle.

11. The method of claim 7, wherein the up-finding measurements are acquired through detecting reflections of an emitted laser and determining at least one of:
   whether the reflections are being received; and
   periodicity of intensity of the detected reflections.

12. The method of claim 7, wherein the up-finding measurements provide the bound for the errors in the inertial measurements by comparing a number of detected spins from the up-finding measurements against a number of estimated spins based on the inertial measurements.

13. The method of claim 7, wherein the up-finding measurements comprise at least one of:
- an indication that an up-finding sensor making the up-finding measurements has pointed towards the particular direction; and
- a count of a number of times the up-finding sensor has pointed toward the particular direction.

14. A system comprising:
- an inertial measurement unit that provides inertial measurements of a vehicle;
- an up-finding sensor that provides up-finding measurements based on when a portion of the vehicle is pointing up, wherein the up-finding sensor uses light to detect when a portion of the vehicle is facing a particular direction; and
- one or more processors configured to:
  - implement a model-based trajectory predictor, wherein the model-based trajectory predictor calculates trajectory predictions using at least one of the up-finding measurements and the inertial measurements; and
  - calculate an integrated navigation solution by determining a number of detected spins from the up-finding sensor and the trajectory predictions and bounding errors in the inertial measurements during navigation of the vehicle using the trajectory predictions by comparing the number of detected spins against a number of estimated spins based on the inertial measurements.

15. The system of claim 14, wherein the up-finding sensor acquires the up-finding measurements without communicating with devices not located on the vehicle.

* * * * *